UNITED STATES PATENT OFFICE 2,492,336

STABILIZATION OF ORGANIC COMPOUNDS

Ralph B. Thompson and Joseph A. Chenicek, Riverside, Ill., assignors to Universal Oil Products Company, Chicago, Ill., a corporation of Delaware No Drawing. Application April 12, 1947,
Serial No. 740,997

12 Claims. (Cl. 99—163)

This invention relates to the stabilization of organic compounds which tend to deteriorate in storage or in use due to oxidation reactions.

Various organic compounds including motor fuel, particularly cracked gasoline, polymer gasoline, Diesel oil, etc., mineral oil, lubricating oil, fuel oil, drying oil, greases, rubber, edible fats and oils, etc., are adversely affected by oxygen, with the resultant formation of undesirable gum, discoloration, rancidity or other deleterious reactions.

The invention is particularly applicable to the stabilization of edible fats and oils which generally are of animal or vegetable origin and which tend to become rancid, especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats as sold under various trade names including "Spry," "Crisco," "Snowdrift," etc. It is understood that other oils and fats may be treated within the scope of the present invention, including oils and fats which have previously been subjected to various treatments, such as blowing with air, heat treatment, etc.

In one embodiment the present invention relates to a method of stabilizing an organic material subject to oxidative deterioration which comprises adding thereto an inhibitor comprising the condensation product of a mono-alpha-beta-unsaturated ketone with hydrogen sulfide.

In a specific embodiment the present invention relates to a method of stabilizing edible fats and oils against rancidity which comprises adding thereto a bis-(ketoalkyl) sulfide.

In a more specific embodiment the present invention relates to a method of stabilizing edible fats and oils against rancidity which comprises adding thereto from about 0.001% to about 0.5% by weight of bis-(γ-ketobutyl) sulfide.

The inhibitors of the present invention are prepared by reacting hydrogen sulfide with a mono-alpha-beta-unsaturated ketone. Suitable mono-alpha-beta-unsaturated ketones include vinyl methyl ketone, vinyl ethyl ketone, vinyl propyl ketone, vinyl butyl ketone, vinyl phenyl ketone, vinyl tolyl ketone, etc., mesityl oxide, benzalacetone, benzalacetophenone, dypnone, cyclohexenone-2, cyclohexylidene-cyclohexanone, cyclohexylidenetetralone, etc.

The reaction of hydrogen sulfide and the mono-alpha-beta-unsaturated ketone is readily effected, preferably in the presence of either a basic or acid catalyst. Suitable basic catalysts include piperidine, sodium methylate, quaternary ammonium hydroxides, etc. Suitable acid catalysts include anhydrous hydrogen chloride, anhydrous hydrogen bromide, anhydrous hydrogen fluoride, etc.

The reaction may be effected either by working under sufficient pressure to maintain the hydrogen sulfide in liquid phase and suitably admixing the liquids, or by passing hydrogen sulfide gas into a cooled mixture of the ketone and catalyst. When desired the ketone may be dissolved in a suitable non-reactive solvent, such ethyl acetate.

The inhibitors of the present invention may be further illustrated by the following general formula:

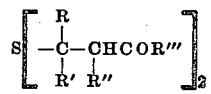

where R, R′, R″ and R‴ are selected from the group consisting of hydrogen, alkyl, alkenyl, aryl, alkaryl, aralkyl, cycloalkyl and heterocyclic ring radicals. It is understood that these substituent groups may in turn be substituted by radicals such as hydroxyl, amino, mono- or dialkyl-amino, etc. In another embodiment of the invention R and R′ and/or R″ and R‴ may comprise carbon atoms forming a polymethylene ring as, for example, in cyclohexylidene-cyclohexanone.

It is understood that an extensive number of compounds may be prepared and used within the broad scope of the present invention but that, while all of these compounds will have some potency in stabilizing organic materials, they are not necessarily of equivalent activity.

It is essential in all these inhibitors that the sulfur atom is attached to a carbon atom beta to the keto group as it has been found that compounds in which the sulfur atom is attached to a carbon atom alpha to the keto group are not good inhibitors. Further, it is generally preferred that the total number of carbon atoms in the inhibitor is not greater than about 25, as it has been found that, within certain limits, the potency of the inhibtor decrease with inclusion of hydrocarbon radicals of high molecular weight.

The inhibitor of the present invention is generally added to the organic material in amounts of less than 1% by weight. When used in edible fats and oils the inhibitor will generally be employed in amounts of from about 0.001% to about 0.5% by weight, and when used in gasoline the inhibitor will generally be used in amounts above about 0.02% by weight. The inhibitor may be used alone or in conjunction with synergists, inhibitor activators, dyes, antiknock agents, etc., depending upon the material to be stabilized. For example, when used in edible fats and oils a synergist, such as phosphoric acid or ascorbic acid, will generally be used along with the inhibitor. When used in gasoline, lead tetraethyl, a dye and perhaps an inhibitor activator, such as certain types of alkylene polyamines, may be used.

The following example is introduced to illustrate further the novelty and utility of the present invention, but not with the intention of unduly limiting the same.

Bis-($\gamma$-ketobutyl) sulfide was prepared as follows: Vinyl methyl ketone and piperidine were cooled in an ice bath and hydrogen sulfide was slowly passed into the mixture, after which the mixture was heated on a steam bath for one-half hour and then was dissolved in benzene and washed with saturated sodium chloride containing a little sulfuric acid. The solvent was evaporated and the product was distilled in vacuo.

The inhibitor prepared in the above manner was tested in lard having a normal stability period of 4½ hours as determined by the "Swift" test. This test is described in detail in the article by A. E. King, H. L. Roschen and W. H. Irwin, which appeared in the "Oil and Soap," vol. X, No. 6, pages 106–109 (1933). In general this test comprises bubbling air through a sample of the lard until rancidity is determined organoleptically and by peroxide values.

0.02% by weight of the above inhibitor increased the number of hours until the lard developed a peroxide value of 20 from 4½ hours to 57 hours.

We claim as our invention:

1. A method of stabilizing an organic material subject to oxidative deterioration which comprises adding thereto an inhibitor comprising a bis-($\gamma$-ketoalkyl) sulfide.

2. A method of stabilizing an organic material subject to oxidative deterioration which comprises adding thereto bis-($\gamma$-ketobutyl) sulfide in an amount sufficient to retard said deterioration.

3. A method of stabilizing an organic material subject to oxidative deterioration which comprises adding thereto an inhibitor of the following general formula:

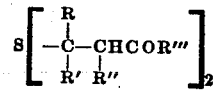

in which R, R', R'' and R''' are selected from the group consisting of hydrogen, alkyl, alkenyl, aryl, aralkyl, alkaryl, cycloalkyl and heterocylic ring radicals.

4. The method of claim 3 wherein said organic material comprises edible fats and oils.

5. The method of claim 3 wherein said organic material comprises motor fuel.

6. The method of claim 3 wherein said organic material comprises lubricating oil.

7. A method of stabilizing edible fats and oils against rancidity which comprises adding thereto from about 0.001% to about 0.5% by weight of bis-($\gamma$-ketobutyl) sulfide.

8. Edible fats and oils tending to become rancid containing a bis-($\gamma$-ketoalkyl) sulfide in an amount sufficient to retard rancidity.

9. Edible fats and oils tending to become rancid containing from about 0.001% to about 0.5% by weight of bis-($\gamma$-ketobutyl) sulfide.

10. Cracked gasoline containing from about 0.001% to about 0.5% by weight of bis-($\gamma$-ketobutyl) sulfide.

11. An organic material subject to oxidative deterioration containing a bis-($\gamma$-ketoalkyl) sulfide in sufficient amount to retard said deterioration.

12. Cracked gasoline containing a bis-($\gamma$-ketoalkyl) sulfide in sufficient amount to retard oxidative deterioration.

RALPH B. THOMPSON.
JOSEPH A. CHENICEK.

REFERENCES CITED

The following references are of record in the file of this patent:

UNITED STATES PATENTS

| Number | Name | Date |
|---|---|---|
| 2,320,287 | Lieber et al. | May 25, 1943 |
| 2,396,156 | Clarkson | Mar. 5, 1946 |